(12) United States Patent
Oono et al.

(10) Patent No.: US 11,732,109 B2
(45) Date of Patent: Aug. 22, 2023

(54) PLASTICIZER COMPOSITION, METHOD FOR PRODUCING SAME, TRANSPARENT FILM, AND LAMINATED GLASS

(71) Applicants: ADMATECHS CO., LTD., Miyoshi (JP); SEKISUI CHEMICAL CO., LTD., Osaka (JP)

(72) Inventors: Yuji Oono, Miyoshi (JP); Yuu Sakamoto, Kouka (JP); Tatsuya Iwamoto, Kouka (JP)

(73) Assignees: ADMATECHS CO., LTD., Miyoshi (JP); SEKISUI CHEMICAL CO., LTD., Osaka (JP)

( * ) Notice: Subject to any disclaimer, the term of this patent is extended or adjusted under 35 U.S.C. 154(b) by 457 days.

(21) Appl. No.: 16/915,352

(22) Filed: Jun. 29, 2020

(65) Prior Publication Data

US 2020/0325305 A1 Oct. 15, 2020

Related U.S. Application Data

(63) Continuation of application No. PCT/JP2018/047280, filed on Dec. 21, 2018.

(30) Foreign Application Priority Data

Dec. 28, 2017 (JP) ................. 2017-254711

(51) Int. Cl.

| | |
|---|---|
| C08K 13/06 | (2006.01) |
| B32B 17/10 | (2006.01) |
| C08K 3/36 | (2006.01) |
| C08K 5/103 | (2006.01) |
| C08K 9/06 | (2006.01) |
| C08L 1/12 | (2006.01) |
| C08L 29/14 | (2006.01) |
| C09C 1/30 | (2006.01) |

(52) U.S. Cl.
CPC ........ *C08K 13/06* (2013.01); *B32B 17/10036* (2013.01); *B32B 17/10605* (2013.01); *B32B 17/10761* (2013.01); *C08K 3/36* (2013.01); *C08K 5/103* (2013.01); *C08K 9/06* (2013.01); *C08L 1/12* (2013.01); *C08L 29/14* (2013.01); *C09C 1/3081* (2013.01); *B32B 2250/03* (2013.01); *B32B 2250/40* (2013.01); *C01P 2004/61* (2013.01); *C01P 2004/62* (2013.01); *C01P 2004/64* (2013.01); *C01P 2006/12* (2013.01); *C08K 2201/005* (2013.01); *C08K 2201/006* (2013.01); *C08K 2201/011* (2013.01); *C08L 2205/06* (2013.01)

(58) Field of Classification Search
CPC .......... C08K 13/06; C08K 3/36; C08K 5/103; C08K 9/06; B32B 17/10036; B32B 17/10605; B32B 17/10761

See application file for complete search history.

(56) References Cited

U.S. PATENT DOCUMENTS

| | | | |
|---|---|---|---|
| 8,512,801 B2 * | 8/2013 | Yoshihara | ............... G02B 1/111 427/164 |
| 2006/0110593 A1 | 5/2006 | Fukatani et al. | |
| 2007/0028778 A1 | 2/2007 | Meinander | |
| 2007/0287786 A1 | 12/2007 | Yuan | |
| 2008/0124540 A1 | 5/2008 | Yuan | |
| 2009/0176084 A1 | 7/2009 | Yoshihara et al. | |
| 2011/0268875 A1 | 11/2011 | Yoshihara et al. | |
| 2021/0070020 A1 | 3/2021 | Sakamoto | |

FOREIGN PATENT DOCUMENTS

| | | |
|---|---|---|
| CN | 101460303 A | 6/2009 |
| EP | 3 778 519 A1 | 2/2021 |
| JP | 05-051243 A | 3/1993 |
| JP | 2006-293201 A | 10/2006 |
| JP | 2009-053691 A | 3/2009 |
| JP | 2009-107857 A | 5/2009 |
| JP | 2009-540065 A | 11/2009 |
| JP | 2011-251906 A | 12/2011 |

(Continued)

OTHER PUBLICATIONS

International Search Report and Written Opinion dated Mar. 26, 2019 in PCT/JP2018/047280, filed Dec. 21, 2018, (with English Translation).

Written Opinion of IPEA dated Dec. 3, 2019 in PCT/JP2018/047280, filed Dec. 21, 2018, (with English Translation).

Combined Chinese Office Action and Search Report dated Dec. 14, 2021 in Chinese Patent Application No. 201880083422.5 (with unedited computer generated English translation), 27 pages.

(Continued)

*Primary Examiner* — Edward J Cain

(74) *Attorney, Agent, or Firm* — Oblon, McClelland, Maier & Neustadt, L.L.P.

(57) ABSTRACT

A plasticizer composition to be used in a transparent resin for optics, wherein the plasticizer composition includes: a composite aggregated particulate material; and a liquid plasticizer having dispersed therein the composite aggregated particulate material. The composite aggregated particulate material includes an inorganic aggregate material being a granular material formed of aggregates of an inorganic particulate material formed of silica having a specific surface area particle diameter of not less than 0.8 nm and not greater than 80 nm, and an organic coating material formed of an organic matter coating a surface of the inorganic aggregate material. A mass of the organic coating material is not less than 0.8% and not greater than 80% with respect to a sum of a mass of the inorganic aggregate material and a mass of the organic coating material. Both mechanical properties and optical properties are realized by mixing the plasticizer composition.

18 Claims, 1 Drawing Sheet

(56) References Cited

FOREIGN PATENT DOCUMENTS

| JP | 2013-204029 A | 10/2013 |
|----|---------------|---------|
| JP | 2014-089347 A | 5/2014 |
| JP | 2015-034303 A | 2/2015 |
| KR | 10-2013-0065695 A | 6/2013 |
| KR | 10-1512854 B1 | 4/2015 |
| WO | WO 2008/122610 A1 | 10/2008 |
| WO | WO2017/130585 A1 | 8/2017 |

OTHER PUBLICATIONS

Extended European Search Report dated Sep. 9, 2021 in corresponding European Patent Application No. 18893969.8, 10 pages.
Evonik: "AEROSIL—Fumed Silica Technical Overview", XP055830557, Dec. 2015, the whole document, 104 pages.
International Preliminary Report on Patentability dated Apr. 14, 2020 in PCT/JP2018/047280, filed Dec. 21, 2018 (with English Translation).
Request for the Submission of an Opinion dated Dec. 8, 2022 in Korean Patent Application No. 10-2020-7016841 (with English machine translation), 11 pages.

\* cited by examiner

PLASTICIZER COMPOSITION, METHOD FOR PRODUCING SAME, TRANSPARENT FILM, AND LAMINATED GLASS

TECHNICAL FIELD

The present invention relates to a plasticizer composition to be used in a transparent resin, a method for producing the plasticizer composition, a transparent film containing the plasticizer composition, and a laminated glass.

BACKGROUND ART

To date, for the purpose of improving mechanical properties of a resin material, a resin composition is produced by dispersing therein a particulate material formed of silica. The obtained resin composition exhibits high mechanical properties.

Meanwhile, a resin composition to be applied to an optical usage is sometimes also desired to have improved mechanical properties sometimes. In such a case, the particulate material to be dispersed is required to have an appropriate refractive index in accordance with the refractive index of a resin material and the refractive index required for the resin composition.

Further, when a resin composition is applied to an optical material, optical properties that should be satisfied also exist, in addition to the refractive index. Thus, a particulate material other than particulate material obtained by conventional art is desired to be provided.

Since the refractive index of silica is substantially constant, in order to adjust a refractive index, surface treatment is performed by use of a silane coupling agent, thereby controlling the refractive index. Such a technology is disclosed in Patent Literature 1.

The silica particles obtained by the technology disclosed by Patent Literature 1 have a particle diameter of 2 nm to 100 nm, and are particles disaggregated down to primary particles.

CITATION LIST

Patent Literature

Patent Literature 1: JP2013-204029(A)

SUMMARY OF INVENTION

Technical Problem

Here, when improvement of mechanical properties is intended, the greater the particle diameter is, the better. However, in a case where the particle diameter is increased in order to improve the mechanical properties, if the particle diameter of the silica particles is increased too much to be ignored with respect to an assumed wavelength of a ray of light, the haze value is increased, resulting in decreased light transmission performance.

In addition, when a transparent film having a high flexibility or the like is to be provided, dispersibility of the particulate material into the transparent film poses a challenge.

The present invention has been completed in view of these circumstances. A problem addressed by the present invention is to provide a plasticizer composition suitably used for dispersing a particulate material formed of silica into a transparent resin and realizing mechanical properties and optical properties different from conventional mechanical properties and optical properties, a method for producing the plasticizer composition, a transparent film using the plasticizer composition, and a laminated glass.

Solution to Problem

As a result of thorough investigation by the present inventors for solving the above problem, the present inventors have obtained the findings below. In order to improve transparency when a particulate material is mixed into a resin, the transmission amount of rays of light needs to be improved, and the haze value needs to be decreased. In order to decrease the haze value, reduction of the particle diameter of the particulate material formed of silica to be contained is effective. In addition, in order to change the refractive index of silica particles, the particle diameter of the silica particles needs to be reduced in accordance with the wavelength of light.

However, when the particle diameter of the particulate material was simply reduced, the mechanical properties of the resin composition obtained by dispersing the particulate material in a resin were not sufficiently improved in many cases.

In order to overcome this antinomy, the present inventors found the following. That is, if aggregates of primary particles are employed as a particulate material, and the particle diameter of the primary particles forming the aggregates is reduced, improvement of mechanical properties due to increase of the particle diameter of the aggregates and improvement of optical properties due to decrease of the particle diameter of the primary particles forming the aggregates are both realized. In addition, since the aggregates are employed, dispersibility into the resin material is improved. In that case, if coating with an organic coating material is provided by performing surface treatment with use of a silane compound such as a silane coupling agent, the refractive index is adjusted, and the dispersibility into the resin material is also improved. Since the particle diameter of the primary particles has been reduced, optical influence due to the organic coating material formed by performing surface treatment with the silane compound is reduced, and suitable optical properties are obtained.

Further, the dispersibility in a plasticizer was found to be improved by using a granular material formed of aggregates. In addition, a resin composition having high optical performance was found to be obtained by adding into a resin material a plasticizer composition having dispersed therein the granular material. The present invention was completed on the basis of the findings.

1. A plasticizer composition to be used in a transparent resin for optics, the plasticizer composition including:
   a composite aggregated particulate material; and
   a liquid plasticizer having dispersed therein the composite aggregated particulate material,
   the composite aggregated particulate material including
   an inorganic aggregate material being a granular material formed of aggregates of an inorganic particulate material formed of silica having a specific surface area particle diameter of not less than 0.8 nm and not greater than 80 nm, and
   an organic coating material formed of an organic matter coating a surface of the inorganic aggregate material,
   a mass of the organic coating material being not less than 0.8% and not greater than 80% with respect to a sum of a mass of the inorganic aggregate material and a mass of the organic coating material.

2. The plasticizer composition according to 1., wherein the inorganic aggregate material has a volume average particle diameter of not less than 0.05 μm and not greater than 500 μm, and has a mode diameter of not less than 0.05 μm and not greater than 500 μm.

3. The plasticizer composition according to 1. or 2., wherein the inorganic aggregate material is gel-derived silica, precipitated silica, or fumed silica.

4. The plasticizer composition according to any one of 1. to 3., wherein the liquid plasticizer is triethylene glycol di-2-ethylhexanoate.

5. The plasticizer composition according to any one of 1. to 4., wherein the organic matter is bound to a surface of the inorganic particulate material via SiO bonds.

6. The plasticizer composition according to any one of 1. to 5., wherein the organic matter is a silazane hydrolysate or a condensation product of a silane compound having one or more SiOR groups. Here, R is a hydrocarbon group.

7. A method for producing the plasticizer composition according to any one of 1. to 6. above, the method including:
an inorganic aggregate material production step of producing an inorganic aggregate material as aggregates from an inorganic particulate material formed of silica having a specific surface area particle diameter of not less than 0.8 nm and not greater than 80 nm; and
an organic coating material coating step of forming an organic coating material by reacting a silane compound with the inorganic aggregate material at a surface thereof, so as to produce a composite aggregated particulate material.

8. A transparent film comprising:
a transparent resin material; and
a composite aggregated particulate material dispersed in the transparent resin material,
the composite aggregated particulate material including
an inorganic aggregate material being a granular material formed of aggregates of an inorganic particulate material formed of silica having a specific surface area particle diameter of not less than 0.8 nm and not greater than 80 nm, and
an organic coating material formed of an organic matter coating a surface of the inorganic aggregate material,
a mass of the organic coating material being not less than 0.8% and not greater than 80% with respect to a sum of a mass of the inorganic aggregate material and a mass of the organic coating material.

9. The transparent film according to 8., including triethylene glycol di-2-ethylhexanoate, wherein
the transparent resin material is polyvinyl acetal or triacetyl cellulose.

10. The transparent film according to 9., wherein
the transparent resin material is polyvinyl butyral, and
the transparent film is used for an interlayer film for a laminated glass.

11. The transparent film according to 9., wherein
the transparent resin material is triacetyl cellulose, and
the transparent film is used for an outermost surface layer for a liquid crystal panel.

12. A laminated glass including:
a first lamination glass member;
a second lamination glass member; and
an interlayer film for laminated glass being the transparent film according to any one of 8. to 10., wherein
the interlayer film for laminated glass is disposed between the first lamination glass member and the second lamination glass member.

Advantageous Effects of Invention

The plasticizer composition of the present invention has the above configuration and thus exhibits the following effects. That is, the inorganic aggregate material is formed of primary particles having a predetermined particle diameter, and the surface of the inorganic aggregate material is coated with the organic coating material, and thus, the plasticizer composition provides sufficient optical properties. The primary particles formed of silica are firmly bound to one another by being aggregated, and when the composite aggregated particulate material is dispersed in a resin material, high mechanical properties are provided. By employing a form of a plasticizer composition in which the composite aggregated particulate material is dispersed in a liquid plasticizer in advance, sufficient dispersion into the resin material is realized.

DESCRIPTION OF EMBODIMENTS

Figure 1:
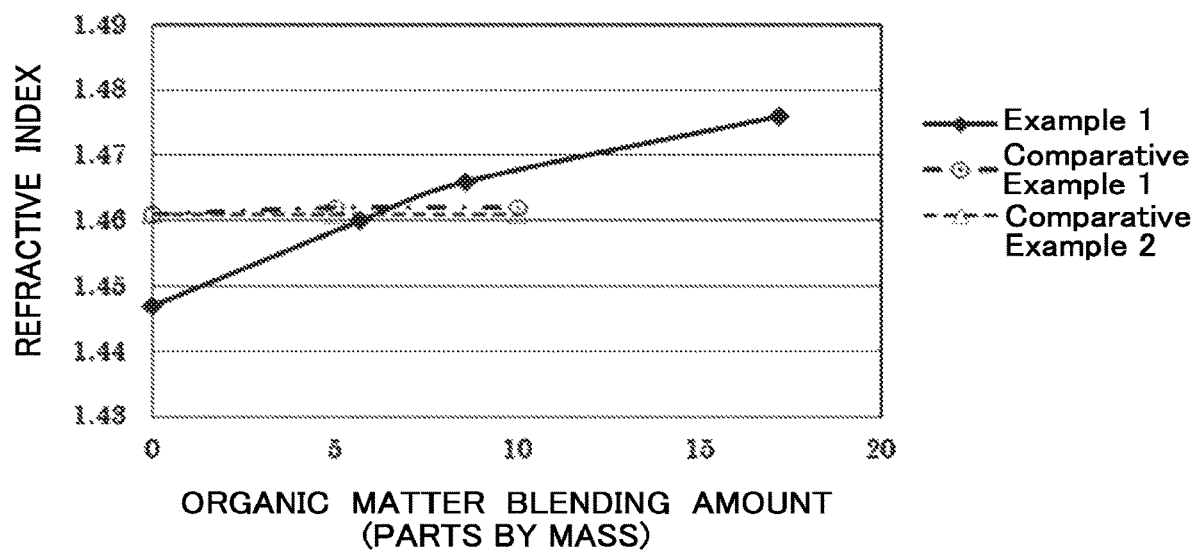
FIG. 1 is a graph showing change in refractive index when the type of silica particles and the amount of an organic coating material are changed in Example.

A plasticizer composition of the present invention, a method for producing the plasticizer composition, and a transparent film using the plasticizer composition are described in detail on the basis of the following embodiment. The plasticizer composition of the present embodiment is used by being mixed into a transparent resin for optics. A "transparent resin for optics" herein is a resin material that allows rays of light in a target wavelength range to be transmitted therethrough in a necessary proportion. Examples of such a transparent resin for optics include an interlayer film for a laminated glass and an outermost surface layer for a liquid crystal panel.

(Plasticizer Composition)

The plasticizer composition of the present embodiment includes a composite aggregated particulate material and a liquid plasticizer.

The composite aggregated particulate material is a granular material including an inorganic aggregate material and an organic coating material. The inorganic aggregate material is aggregates of an inorganic particulate material. Preferably, the inorganic aggregate material has a volume average particle diameter of not less than 0.05 μm and not greater than 500 μm. Preferable examples of the lower limit of the volume average particle diameter include 0.05 μm, 0.1 μm, and 0.5 μm. Preferable examples of the upper limit of the volume average particle diameter include 10 μm, 100 μm, and 500 μm. The upper limit values and the lower limit values are combined as desired. Preferably, the inorganic aggregate material has a mode diameter of not less than 0.05 μm and not greater than 500 μm. Preferable examples of the lower limit of the range in which the inorganic aggregate material has the mode diameter include 0.05 μm, 0.1 μm, and 0.5 μm. Preferable examples of the upper limit of the range in which the inorganic aggregate material has the mode diameter include 10 μm, 100 μm, and 500 μm. The upper limit values and the lower limit values are combined as desired. When the magnitudes of the volume average particle diameter and the mode diameter are not less than the lower limit values, mechanical properties when the inorganic aggregate material is dispersed into a transparent resin material are improved. When the magnitudes of the volume average particle diameter and the mode diameter are not greater than the upper limits, flexibility when the inorganic aggregate material is dispersed into the transparent resin material is improved.

The inorganic particulate material is particles formed of silica having a specific surface area particle diameter of not less than 0.8 nm and not greater than 80 nm. The specific surface area particle diameter is a value calculated as a sphere equivalent diameter from the specific surface area measured by a BET method using nitrogen. As for the aggregates, calculation is performed on an assumption that particles are in point contact with one another. As a preferable lower limit of the specific surface area particle diameter, 1 nm, 5 nm, or 10 nm is employed, and as a preferable upper limit, 30 nm, 50 nm, or 70 nm is employed. When the specific surface area particle diameter of the inorganic particulate material is not less than the lower limit values, mechanical properties when the composite aggregated particulate material is dispersed into a transparent resin are improved. When the specific surface area particle diameter of the inorganic particulate material is not greater than the upper limit values, optical properties when the composite aggregated particulate material is dispersed into the transparent resin are improved. The upper limit values and the lower limit values are combined as desired. The specific surface area particle diameter (d) is calculated as $d=6/(\rho S)$. Here, $\rho$ is the density of silica forming the inorganic aggregate material, and S is a measured specific surface area.

The method for forming aggregates is not limited in particular. Normally, when an inorganic particulate material to serve as primary particles is produced by a wet process and then dried, aggregates are formed in many cases. The inorganic particulate material may be produced either by a wet process or by a dry process. A wet process using sodium silicate as a raw material is widely employed. Examples of the inorganic particulate material produced by a wet process include gel-derived silica, precipitated silica, and colloidal silica. In particular, the gel-derived silica is preferable because, if the pH is rapidly made to be acidic, primary particles having small particle diameters are produced, and in addition, formed aggregates are dense. As for the gel-derived silica, when obtained aggregates are broken down, an inorganic aggregate material having a targeted particle diameter is produced. Examples of a dry process include fumed silica, and a combustion process, an arc process, or the like may be employed.

The organic coating material coats the surface of the inorganic aggregate material. Here, "coat" denotes a state where the organic coating material is attached to at least a part of the surface of the inorganic aggregate material, and a state where the organic coating material coats the entirety of the surface is preferable. As a result of aggregation of the inorganic particulate material serving as the primary particles, vacancy is formed inside the inorganic aggregate material (among the primary particles). Preferably, the organic coating material also coats the surface around the vacancy formed inside the inorganic aggregate material.

The mass of the organic coating material is not less than 0.8% and not greater than 80% with respect to the mass of the entirety of the composite aggregated particulate material (the sum of the mass of the inorganic aggregate material and the mass of the organic coating material). The lower limit is preferably 0.8%, 2%, or 5%, and the upper limit is preferably 60%, 70%, or 80%. The upper limit values and the lower limit values are combined as desired. When the lower limit is not less than the lower limit values, sufficient surface modification is realized. When the upper limit is not greater than the upper limit values, mechanical properties of the obtained composite aggregated particulate material are improved.

Preferably, the organic coating material are bound to the surface of the inorganic aggregate material by SiO bonds. The material forming the organic coating material is not limited in particular, but is preferably formed from a silicon compound. In particular, a condensation product of a silane compound having one or more SiOR groups is preferable, and a condensation product of an organic silane compound having two or more SiOR groups is more preferable. Here, R is a hydrocarbon group (preferably, having about 1 or 2 carbon atoms). The silane compound includes an organic functional group. An example of the organic coating material is an organic coating material produced by reacting a silane compound with the inorganic aggregate material at the surface thereof. As the silane compound, a silazane hydrolysate is also preferably employed. An example of the silazane forming the silazane hydrolysate is hexamethyldisilazane.

Examples of the organic functional group in the silane compound include a hydrocarbon group (an aryl group such as a phenyl group, an alkyl group, a vinyl group, and the like), an epoxy group, and an acrylic group. For selection of an organic functional group, whether the refractive index is greater or smaller than the refractive index of silica (if the refractive index is great, an increased refractive index is realized through reaction, and if the refractive index is small, a reduced refractive index is realized), and affinity with the transparent resin and the plasticizer in which the silane compound is to be dispersed, are taken into consideration. As the silane compound, triphenyl methoxy silane having a large number of phenyl groups and thus increasing the refractive index, and a condensation product of the triphenyl methoxy silane are preferable, in particular.

Specifically, in general, the refractive index of an interlayer film is often greater than the refractive index of silica. In this case, a compound having a greater refractive index than silica and including an aryl group, such as phenyltrimethoxysilane, phenyltriethoxysilane, diphenyldimethoxysilane, diphenyldiethoxysilane, triphenylmonomethoxysilane, triphenylmonoethoxysilane, diphenyl tetramethoxydisilazane, dimethyl tetraphenyldisilazane, or hexaphenyldisilazane may be selected. A condensation product obtained by combining two or more of the above may be used.

The plasticizer is a material in a liquid state. Whether the plasticizer is in a liquid state or not is determined at a normal temperature, or at a temperature at the time when the plasticizer is added to a resin material. The type of the plasticizer is not limited in particular, but examples of the plasticizer include organic ester plasticizers such as a monobasic organic acid ester and a polybasic organic acid ester, organic phosphate plasticizers such as an organic phosphate plasticizer and an organic phosphite plasticizer, and the like. In particular, organic ester plasticizers are preferable.

Examples of the monobasic organic acid ester include a glycol ester obtained through reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, and the like.

Examples of the polybasic organic acid ester include an ester compound of a polybasic organic acid and an alcohol having a linear or branched structure having 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Adipic acid esters other than the above-described adipic acid esters may be used.

Examples of the organic phosphate plasticizer include tributoxyethyl phosphate, isodecyl phenyl phosphate, triisopropyl phosphate, and the like. Preferably, the plasticizer is a diester plasticizer represented by the following formula (1).

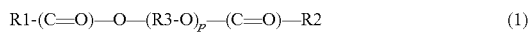

$$R1-(C=O)-O-(R3-O)_p-(C=O)-R2 \quad (1)$$

In formula (1), R1 and R2 each represent an organic group having 2 to 10 carbon atoms, R3 represents an ethylene group, an isopropylene group, or an n-propylene group, and p represents an integer of 3 to 10. Preferably, R1 and R2 in formula (1) are each an organic group having 5 to 10 carbon atoms, and more preferably an organic group having 6 to 10 carbon atoms.

Preferably, the plasticizer contains triethylene glycol di-2-ethylhexanoate (3GO), triethylene glycol di-2-ethylbutyrate (3GH), or triethylene glycol di-2-ethylpropanoate. More preferably, the plasticizer contains triethylene glycol di-2-ethylhexanoate or triethylene glycol di-2-ethylbutyrate. Further preferably, the plasticizer contains triethylene glycol di-2-ethylhexanoate.

The mixing amounts of the plasticizer and the inorganic aggregate material are not limited in particular. However, when the mass of the inorganic aggregate material is assumed as 100 parts by mass, the content of the plasticizer is preferably not less than 100 parts by mass and not greater than 1900 parts by mass. Preferable examples of the lower limit of the content of the plasticizer include 100 parts by mass, 150 parts by mass, and 233 parts by mass, and preferable examples of the upper limit include 900 parts by mass, 1300 parts by mass, and 1900 parts by mass. The upper limit values and the lower limit values are combined as desired. When the lower limit is not less than the lower limit values, the effect of the plasticizer at the time of dispersion into the transparent resin is sufficiently exhibited. When the upper limit is not greater than the upper limit values, mechanical properties derived from the inorganic aggregate material when dispersed into the transparent resin is sufficiently exhibited.

(Method for Producing Plasticizer Composition)

The method for producing a plasticizer composition of the present embodiment is the method for producing the plasticizer composition of the present embodiment described above. The method for producing the plasticizer composition of the present embodiment includes an inorganic aggregate material production step and an organic coating material coating step.

The inorganic aggregate material production step is a step of producing the inorganic aggregate material by causing the above-described inorganic particulate material to be aggregated. The aggregation method is not limited in particular. For example, the inorganic particulate material is produced in a liquid and then dried to be aggregated, or the inorganic particulate material in a dry state is dispersed into a liquid such as water, and then dried to be aggregated. In particular, a gel-derived silica production method in which an inorganic particulate material having a small particle diameter is deposited by causing sodium silicate such as water glass to rapidly be acidic is preferably employed, because the particle diameter of the inorganic particulate material serving as the primary particles is made small, and the obtained inorganic aggregate material is made dense. The obtained inorganic aggregate material is controlled so as to have a necessary particle diameter, by being broken down or classification.

The organic coating material coating step is a step of obtaining the composite aggregated particulate material by coating the surface of the inorganic aggregate material with the organic coating material. The organic coating material coating step may be performed by reacting a silane compound including an organic functional group with the inorganic aggregate material at the surface thereof. The organic coating material coating step may be performed by spraying or attaching, to the surface of the inorganic aggregate material, the silane compound as is or in the form of a solution using a solvent. Preferably, after the silane compound is attached to the surface, heating or the like is performed to complete the reaction. The silane compound is not limited in particular, and the compound described above may be employed.

The composite aggregated particulate material obtained in the organic coating material coating step is dispersed into the plasticizer to become the plasticizer composition of the present embodiment. The dispersion method into the plasticizer is not limited in particular, but preferably, the plasticizer and the inorganic aggregate material are well mixed with each other. The mixing may be performed by a known method, preferably, with the plasticizer being in a liquid state.

(Transparent Film)

The transparent film of the present embodiment is a member obtained by forming, into a thin film shape, a transparent resin material having dispersed therein the plasticizer composition of the present embodiment described above. Therefore, the transparent film contains the plasticizer and the composite aggregated particulate material in the transparent resin material. The transparent film of the present embodiment may be used as an interlayer film for a laminated glass or an outermost surface layer for a liquid crystal panel (so called TAC film). The transparent film of the present embodiment has a high light transmittance and a small haze value and thus exhibits good optical properties, and has improved mechanical properties. The plasticizer composition is as described above, and is not further described. The amount of the plasticizer composition to be added is not limited in particular as long as the amount is in a range that allows the transparent film to exhibit necessary optical properties and necessary mechanical properties. Preferable examples of the addition amount of the plasticizer composition in terms of the mass of the solid matter (the mass of the inorganic aggregate material) in the plasticizer composition are as follows. The lower limit value of the content of the inorganic aggregate material relative to 100 parts by mass of the transparent resin material is preferably not less than 1 part by mass, more preferably not less than 5 parts by mass, further preferably not less than 10 parts by mass, and particularly preferably not less than 15 parts by mass. The upper limit value of the content of the inorganic aggregate material relative to 100 parts by mass of the transparent resin material is preferably not greater than 70 parts by mass, more preferably not greater than 64 parts by mass, even more preferably not greater than 60 parts by mass, further preferably not greater than 55 parts by mass, particularly preferably not greater than 45 parts by mass, and most preferably not greater than 35 parts by mass. The upper limit values and the lower limit values are combined as desired. When the lower limit is not less than the lower limit values, sufficient mechanical properties are realized, and the upper limit is not greater than the upper limit values, sufficient optical properties are realized.

For the transparent resin material, an appropriate resin material is selected in accordance with the usage to which the transparent film is applied. A transparent resin material that is a thermoplastic resin is particularly preferable. Examples of the thermoplastic resin include a polyvinyl acetal resin, a triacetyl cellulose resin, an ethylene-vinyl acetate copolymer resin, an ethylene-acrylic acid copolymer resin, a polyurethane resin, a polyvinyl alcohol resin, and the like. A thermoplastic resin other than the above may be used. Preferably, the thermoplastic resin contains a polyvinyl acetal resin.

For example, the polyvinyl acetal resin is produced by acetalizing polyvinyl alcohol with an aldehyde. The polyvinyl acetal resin is preferably an acetalized product of polyvinyl alcohol. For example, the polyvinyl alcohol is obtained by saponifying polyvinyl acetate. The saponification degree of the polyvinyl alcohol is generally 70 to 99.9% by mole.

The average polymerization degree of the polyvinyl alcohol is preferably not less than 200, more preferably not less than 500, even more preferably not less than 1500, further preferably not less than 1600, particularly preferably not less than 2600, and most preferably not less than 2700, and is preferably not greater than 5000, more preferably not greater than 4000, and further preferably not greater than 3500. When the average polymerization degree is not less than the lower limit, the penetration resistance of the laminated glass is further enhanced. When the average polymerization degree is not greater than the upper limit, formation of the interlayer film is facilitated.

The average polymerization degree of the polyvinyl alcohol is determined by a method according to JIS K6726 "Testing methods for polyvinyl alcohol".

The number of carbon atoms of the acetal group in the polyvinyl acetal resin is not limited in particular. The aldehyde to be used when producing the polyvinyl acetal resin is not limited in particular. The number of carbon atoms of the acetal group in the polyvinyl acetal resin is preferably 3 to 5, and more preferably 3 or 4. When the number of carbon atoms of the acetal group in the polyvinyl acetal resin is not less than 3, the glass transition temperature of the interlayer film is sufficiently decreased.

The aldehyde is not limited in particular. In general, as the aldehyde, an aldehyde having 1 to 10 carbon atoms is suitably used. Examples of the aldehyde having 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. In particular, propionaldehyde, n-butyraldehyde, isobutyraldehyde, n-hexylaldehyde, or n-valeraldehyde is preferable, propionaldehyde, n-butyraldehyde, or isobutyraldehyde is more preferable, and n-butyraldehyde is further preferable. One type of the aldehyde may be used alone, and two or more types of the aldehyde may be used in combination.

The content of the hydroxyl group in the polyvinyl acetal resin is preferably not less than 25% by mole, more preferably not less than 28% by mole, and further preferably not less than 29% by mole, and is preferably not greater than 35% by mole, more preferably not greater than 32% by mole, and particularly preferably not greater than 31% by mole. When the content of the hydroxyl group is not less than the lower limit, the adhesion force of the interlayer film is further increased. When the content of the hydroxyl group is not greater than the upper limit, the flexibility of the interlayer film is enhanced, and handling of the interlayer film is facilitated.

The content of the hydroxyl group in the polyvinyl acetal resin is a mole fraction, represented in percentage, obtained by dividing the amount of ethylene groups to which the hydroxyl group is bound by the total amount of ethylene groups in the main chain. For example, the amount of ethylene groups to which the hydroxyl group is bound may be measured in accordance with JIS K6728 "Testing methods for polyvinyl butyral".

The acetylation degree of the polyvinyl acetal resin is preferably not less than 0.01% by mole, and more preferably not less than 0.5% by mole, and is preferably not greater than 10% by mole, and more preferably not greater than 2% by mole. When the acetylation degree is not less than the lower limit, the compatibility between the polyvinyl acetal resin and the plasticizer is enhanced. When the acetylation degree is not greater than the upper limit, the moisture resistance of the interlayer film and the laminated glass is enhanced.

The acetylation degree is a mole fraction, represented in percentage, obtained by dividing the amount of ethylene groups to which the acetyl group is bound by the total amount of ethylene groups in the main chain. For example, the amount of ethylene groups to which the acetyl group is bound may be measured in accordance with JIS K6728 "Testing methods for polyvinyl butyral".

The acetalization degree (butyralization degree in the case of polyvinyl butyral resin) of the polyvinyl acetal resin is preferably not less than 55% by mole, and more preferably not less than 67% by mole, and is preferably not greater than 75% by mole, and more preferably not greater than 71% by mole. When the acetalization degree is not less than the lower limit, the compatibility between the polyvinyl acetal resin and the plasticizer is enhanced. When the acetalization degree is not greater than the upper limit, the reaction time required for producing the polyvinyl acetal resin is shortened.

The acetalization degree is a mole fraction, represented in percentage, obtained by dividing, by the total amount of ethylene groups in the main chain, a value obtained by subtracting the amount of ethylene groups to which the acetyl group is bound and the amount of ethylene groups to which the hydroxyl group is bound from the total amount of ethylene groups in the main chain. The acetalization degree may be calculated by a method according to JIS K6728 "Testing methods for polyvinyl butyral".

Preferably, the content of the hydroxyl group (the amount of hydroxyl groups), the acetalization degree (the butyralization degree), and the acetylation degree are calculated from the results measured by a method according to JIS K6728 "Testing methods for polyvinyl butyral". A measurement according to ASTM D1396-92 may be employed. When the polyvinyl acetal resin is a polyvinyl butyral resin, the content of the hydroxyl group (the amount of hydroxyl groups), the acetalization degree (the butyralization degree), and the acetylation degree may be calculated from the results measured by a method according to JIS K6728 "Testing methods for polyvinyl butyral".

As for the transparent resin material, when polyvinyl acetal or triacetyl cellulose is employed, triethylene glycol di-2-ethylhexanoate is preferably employed as the plasticizer to be contained in the plasticizer composition.

When the transparent film is employed as an interlayer film for a laminated glass, the transparent resin material is preferably polyvinyl butyral. When the transparent film is used as an outermost surface layer for the liquid crystal panel, the transparent resin material is preferably triacetyl cellulose. In the cases above, triethylene glycol di-2-ethylhexanoate is preferably employed as the plasticizer to be contained in the plasticizer composition.

(Laminated Glass)

The laminated glass includes a first lamination glass member, a second lamination glass member, and an interlayer film. The interlayer film is disposed and sandwiched between the first lamination glass member and the second lamination glass member.

Examples of the lamination glass member include a glass plate, a PET (polyethylene terephthalate) film, and the like. The laminated glass includes not only a laminated glass in which an interlayer film is sandwiched between two glass plates, but also a laminated glass in which an interlayer film is sandwiched between a glass plate and a PET film or the like. The laminated glass is a laminate including a glass plate, and preferably, at least one glass plate is used in the laminated glass. Preferably, the first lamination glass member and the second lamination glass member are each a glass plate or a PET film, and the laminated glass includes a glass plate as at least one of the first lamination glass member and the second lamination glass member.

Examples of the glass plate include an inorganic glass and an organic glass. Examples of the inorganic glass include a float plate glass, a heat ray absorbing plate glass, a heat ray reflecting plate glass, a polished plate glass, a figured glass, a wire-net plate glass, a wired plate glass, and the like. The organic glass is a synthetic resin glass which is substituted for the inorganic glass. Examples of the organic glass include a polycarbonate plate, a polyacrylic resin plate, a polymethacrylate resin plate, and the like. Examples of the polyacrylic resin plate include a polymethyl acrylate plate and the like, and examples of the polymethacrylate resin plate include a polymethyl methacrylate plate and the like.

The thickness of the lamination glass member is preferably not less than 1 mm, and is preferably not greater than 5 mm, and more preferably not greater than 3 mm. When the lamination glass member is a glass plate, the thickness of the glass plate is preferably not less than 1 mm, and is preferably not greater than 5 mm, and more preferably not greater than 3 mm. When the lamination glass member is a PET film, the thickness of the PET film is preferably not less than 0.03 mm and preferably not greater than 0.5 mm.

The method for producing the laminated glass is not limited in particular. For example, the interlayer film is sandwiched between the first lamination glass member and the second lamination glass member, and then passed through pressure rolls or subjected to decompression suction in a rubber bag, so that the air remaining between the first lamination glass member, the second lamination glass member, and the interlayer film is removed. Then, preliminarily bonding is performed at about 70 to 110° C., to obtain a laminate. Next, the laminate is put in an autoclave or pressed, so that the members are press-bonded at a pressure of about 1 to 1.5 MPa at about 120 to 150° C. Accordingly, a laminated glass is obtained.

Each of the interlayer film and the laminated glass may be used for automobiles, railway vehicles, aircraft, ships, buildings, and the like. Each of the interlayer film and the laminated glass may also be used for usages other than the above usages. Preferably, the interlayer film and the laminated glass are an interlayer film and a laminated glass for vehicles and buildings, and more preferably an interlayer film and a laminated glass for vehicles. Each of the interlayer film and the laminated glass may be used for a windshield, a side glass, a rear glass, a roof glass, or the like of automobiles. Each of the interlayer film and the laminated glass is suitably used for automobiles.

EXAMPLES (Adjustment of Refractive Index)•Examples 1-1 to 1-4

In accordance with the blending amount shown in Table 1, 100 parts by mass of a wet-process silica having a specific surface area of 285 m$^2$/g and a specific surface area particle diameter of 10 nm (the volume average particle diameter of aggregated particles was 2.0 μm) was put in a mixer, and then, the following mixture was added thereto while being stirred: a mixture of phenyltrimethoxysilane (including a phenyl group as an organic functional group: manufactured by Shin-Etsu Chemical, KBM-103) as an alkoxy silane compound, isopropanol, and deionized water at 100 parts by mass, 200 parts by mass, and 100 parts by mass, respectively. The organic matter blending amount in Table 1 denotes the parts by mass of phenyltrimethoxysilane that is a raw material not hydrolyzed. The mixture was allowed to be aged at room temperature for one day, and was transferred to an explosion-proof dryer. After volatile content was eliminated, the mixture was further allowed to react at 160° C. for 5 hours, to obtain composite aggregated particles of each of Examples 1-1 to 1-4. The refractive index was examined by immersing the composite aggregated particles in a plurality of liquids having different refractive index values. At that time, a most transparent liquid was selected, and the refractive index thereof was used as the refractive index of the composite aggregated particles. The results are shown in Table 1 and FIG. 1.

The plurality of liquids having different refractive index values were prepared by mixing two types of compatible liquids (a liquid having a high refractive index and a liquid having a low refractive index), with the mixing ratio varied. For example, with toluene and isopropanol, a plurality of liquids having different refractive indexes in a range of 1.49 to 1.37 were prepared. The refractive index of the mixture was measured by a digital refractometer, and the refractive index of the powder was calculated from the value.

Comparative Examples 1-1 to 1-3

In accordance with the blending amount shown in Table 1, a true-sphere solid silica (product name: ADMAFINE SO-C2) having a specific surface area of 6 m$^2$/g and a volume average particle diameter of 0.5 μm was treated in the same manner as in Example 1, to obtain composite particles of each of Comparative Examples 1-1 to 1-3. The refractive index of the composite particles was measured in the same manner as in Example 1. The results are shown in Table 1 and FIG. 1.

Comparative Examples 2-1 to 2-3

In accordance with the blending amount shown in Table 1, a true-sphere solid silica (product name: ADMAFINE SO-C6) having a specific surface area of 2 $m^2/g$ and a volume average particle diameter of 2.0 μm was treated in the same manner as in Example 1, to obtain composite particles of each of Comparative Examples 2-1 to 2-3. The refractive index of the composite particles was measured in the same manner as in Example 1. The results are shown in Table 1 and FIG. 1.

TABLE 1

| | Silica type | Particle diameter (μm) | Specific surface area ($m^2/g$) | Organic matter blending amount (parts by mass) | Refractive index (20° C.) |
|---|---|---|---|---|---|
| Example 1-1 | Aggregated silica | 2 | 285 | 0 | 1.447 |
| Example 1-2 | Aggregated silica | 2 | 285 | 5.7 | 1.46 |
| Example 1-3 | Aggregated silica | 2 | 285 | 8.6 | 1.466 |
| Example 1-4 | Aggregated silica | 2 | 285 | 17.2 | 1.476 |
| Comparative Example 1-1 | Spherical silica | 0.5 | 6 | 0 | 1.461 |
| Comparative Example 1-2 | Spherical silica | 0.5 | 6 | 5 | 1.462 |
| Comparative Example 1-3 | Spherical silica | 0.5 | 6 | 10 | 1.462 |
| Comparative Example 2-1 | Spherical silica | 2 | 2 | 0 | 1.461 |
| Comparative Example 2-2 | Spherical silica | 2 | 2 | 5 | 1.461 |
| Comparative Example 2-3 | Spherical silica | 2 | 2 | 10 | 1.461 |

As is apparent from Table 1 and FIG. 1, for Examples 1-1 to 1-4 in which an inorganic aggregate material (aggregated silica) formed of primary particles having a specific surface area particle diameter of 10 nm is used, the refractive index was significantly changed by changing the amount of the organic coating material coated on the surface. In the present test, a silane compound including a phenyl group and having a greater refractive index than silica was employed. Thus, in accordance with increase of the amount of the organic coating material, the refractive index was also increased. However, in the reverse, if a silane compound including an organic functional group that forms an organic coating material with a smaller refractive index than silica is employed, the refractive index is considered to be decreased.

In contrast, in Comparative Examples 1-1 to 1-3 and Comparative Examples 2-1 to 2-3 in each of which a spherical silica having a large particle diameter of not less than 0.5 μm was used, the value of the refractive index was found not to be changed so much even when the amount of the organic coating material was changed. The reason for this is considered as follows. That is, since the particle diameter was not less than 0.5 μm which is equivalent to or not less than the wavelength of visible light, the additive property of the refractive index was not realized even when the surface was coated with an organic coating material having a varied refractive index.

(Examination of Interlayer Film for Laminated Glass as Transparent Film)

The interlayer film for laminated glass to be examined in the present embodiment is composed of an intermediate layer and protection layers which sandwich the intermediate layer.

(1) Preparation of Resin Composition for Intermediate Layer

A plasticizer was added to 100 parts by mass of polyvinyl butyral (transparent resin material: the amount of acetyl groups was 13.0% by mole, the amount of butyral groups was 65.0% by mole, and the amount of hydroxyl groups was 23.0% by mole) obtained by acetalizing, by n-butyraldehyde, polyvinyl alcohol having an average polymerization degree of 1700. Then, the resultant mixture was sufficiently kneaded with a mixing roll, to obtain a resin composition for intermediate layer.

The plasticizer was a mixture obtained by mixing 75 parts by mass of triethylene glycol-di-2-ethylhexanoate (3GO) and silica indicated in Table 2 and produced by the same procedure as in above-described Example 1, by the amount indicated in Table 2. The silica mixed was any one of: aggregated silica (Examples 1 to 6) and fumed silica (Example 7) which were surface-treated with phenyltrimethoxysilane and were produced by a method similar to the method used in Examples 1-1 to 1-4; aggregated silica (Comparative Example 2) that was not surface-treated; and spherical silica (Comparative Example 3) corresponding to Comparative Example 2-3 and obtained by surface-treating, with phenyltrimethoxysilane, spherical silica formed of primary particles having a volume average particle diameter of 2.0 μm. The plasticizer in Comparative Example 1 did not contain silica. The preparation was performed such that the particle diameter and the type, amount, and the like of the surface treatment agent had the values indicated in the table. In the table, the silica with an indication of (powder addition) was added to polyvinyl butyral, without being mixed with the plasticizer. As the thickness of the protection layer, the total thickness of the two protection layers is indicated.

(2) Preparation of Resin Composition for Protection Layer 31 parts by mass of triethylene glycol-di-2-ethylhexanoate (3GO) as a plasticizer was added to 100 parts by mass of polyvinyl butyral (the amount of acetyl groups was 1.0% by mole, the amount of butyral groups was 65.0% by mole, and the amount of hydroxyl groups was 35.0% by mole) obtained by acetalizing, by n-butyraldehyde, polyvinyl alcohol having an average polymerization degree of 1700. Then, the resultant mixture was sufficiently kneaded with a mixing roll, to obtain a resin composition for protection layer.

(3) Creation of Interlayer Film for Laminated Glass

The obtained resin composition for intermediate layer and the obtained resin composition for protection layer were subjected to coextrusion using a coextrusion machine, to obtain a 3-layer-structured interlayer film for laminated glass in which: a layer A (protection layer) having a thickness of 360 μm and formed of the resin composition for protection layer, a layer B (interlayer film) having a thickness of 80 μm and formed of the resin composition for intermediate layer, and a layer C (protection layer) having a thickness of 360 μm and formed of the resin composition for protection layer were laminated in this order.

(Evaluation of Flexural Rigidity)

The obtained interlayer film for laminated glass was cut into a 30 cm long×15 cm wide piece, and the obtained piece was sandwiched between a glass plate A (clear float glass, 25 cm long×10 cm wide×1.8 mm thick) and a glass plate B (clear float glass, 25 cm long×10 cm wide×1.0 mm thick), and the resultant object was held in a vacuum laminator at 90° C. for 30 minutes to be pressed under vacuum. The interlayer film for laminated glass protruding outside the glass was cut off, to create an evaluation sample.

Figure 2:
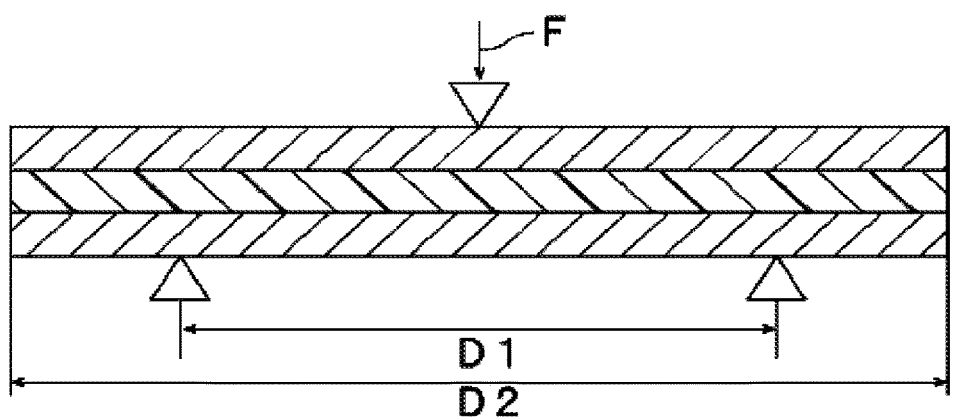
FIG. 2 is a schematic diagram showing a method for measuring flexural rigidity of a laminated glass produced in Example.

The flexural rigidity was evaluated by a testing method schematically shown in FIG. 2. As a measurement device, a universal material testing machine 5966, manufactured by Instron Japan Company Ltd., including a static 3-point bending test jig 2810 was used. Under a measurement condition of a measurement temperature of 20±3° C., a distance D1 of 18 cm, and a distance D2 of 25 cm, the laminated glass was deformed in an F direction at a displacement rate of 1 mm/min, and the stress when a displacement of 1.5 mm was applied was measured. The results of the calculated flexural rigidity are shown in Table 2.

(Evaluation of Young's Modulus)

The resin composition for intermediate layer was subjected to press forming at 150° C. to obtain a molded article (intermediate layer) having a thickness of 800 μm. The obtained molded article was subjected to punching with a super dumbbell cutter: SDK-600 manufactured by DUMBBELL CO., LTD. to obtain a test piece. The obtained test piece was preserved at 23° C. and a humidity of 30% RH for 12 hours. Then, the test piece was subjected to a tensile test using TENSILON manufactured by A&D Company, Limited at 200 mm/min in a thermostatic chamber at 25° C. The slope at an infinitesimal strain region of the obtained stress-strain curve was calculated and used as a Young's modulus. Alternatively, a test piece may be obtained in the following manner: in an environment of 23° C., a first layer obtained by peeling off a second layer and a third layer from the interlayer film is subjected to press forming at 150° C. (at 150° C. for 10 minutes in an unpressurized state, at 150° C. for 10 minutes in a pressurized state) so as to have a thickness of 800 μm, and then, the resultant first layer is subjected to punching with a super dumbbell cutter: SDK-600 manufactured by DUMBBELL CO., LTD.

Specifically, a composition for forming a first layer was mixed, and subjected to press forming at 150° C. to obtain a molded article (intermediate layer) having a thickness of 800 μm. The obtained molded article was subjected to punching with a super dumbbell cutter: SDK-600 manufactured by DUMBBELL CO., LTD., to obtain a test piece of which the entire length was 120 mm. The obtained test piece was preserved at 23° C. and a humidity of 30% RH for 12 hours. Bench marks (gauge length: 40 mm) were provided at 40 mm from both ends of the test piece, and the thickness between the bench marks of the test piece was measured. The thickness of the test piece in each bench mark portion and the thickness of the test piece in an intermediate portion between the two bench marks were measured, and the average value of the thicknesses was used as the thickness between the bench marks. The thickness was measured by "Digimatic Indicator" (ID-C112C) manufactured by Mitutoyo Corporation. Then, the test piece was subjected to a tensile test using TENSILON "RTE-1210" manufactured by A&D Company, Limited at 200 mm/min with a gripping distance set to 7 cm in a thermostatic chamber at 25° C. The stress and the strain were calculated according to the following formulas. The results are shown in Table 2.

Stress=load/initial cross-sectional area between bench marks

Strain=(increase amount of gripping distance/initial gauge length)×100

The slope corresponding to the strain of the obtained stress-strain curve being 0 to 10% was used as the Young's modulus.

(Evaluation of Haze Value)

By a method according to JIS K 6714, a haze value of the obtained laminated glass with respect to a ray of light of 340 to 1800 nm was measured using an integration-type turbidimeter (Manufactured by Tokyo Denshoku Co., Ltd.). In the measurement, the same sample as used in the evaluation of Young's modulus was used. The results are shown in Table 2.

TABLE 2

|  | Comparative Example 1 | Comparative Example 2 | Comparative Example 3 | Example 1 | Example 2 | Example 3 | Example 4 | Example 5 | Example 6 | Example 7 |
|---|---|---|---|---|---|---|---|---|---|---|
| Protection layer |  |  |  |  |  |  |  |  |  |  |
| Average polymerization degree of PVA | 1700 | 1700 | 1700 | 1700 | 1700 | 1700 | 1700 | 1700 | 1700 | 1700 |
| Hydroxyl group [mol %] | 35 | 35 | 35 | 35 | 35 | 35 | 35 | 35 | 35 | 35 |
| Acetyl group [mol %] | 1 | 1 | 1 | 1 | 1 | 1 | 1 | 1 | 1 | 1 |
| Acetal group [mol %] | 65 | 65 | 65 | 65 | 65 | 65 | 65 | 65 | 65 | 65 |
| Number of parts of plasticizer [phr] | 31 | 31 | 31 | 31 | 31 | 31 | 31 | 31 | 31 | 31 |
| Thickness [μm] | 720 | 720 | 720 | 720 | 720 | 720 | 720 | 720 | 720 | 720 |
| Intermediate layer |  |  |  |  |  |  |  |  |  |  |
| Average polymerization degree of PVA | 1700 | 1700 | 1700 | 1700 | 1700 | 1700 | 1700 | 1700 | 1700 | 1700 |
| Hydroxyl group [mol %] | 23 | 23 | 23 | 23 | 23 | 23 | 23 | 23 | 23 | 23 |

TABLE 2-continued

|  | Comparative Example 1 | Comparative Example 2 | Comparative Example 3 | Example 1 | Example 2 | Example 3 | Example 4 | Example 5 | Example 6 | Example 7 |
|---|---|---|---|---|---|---|---|---|---|---|
| Acetyl group [mol %] | 13 | 13 | 13 | 13 | 13 | 13 | 13 | 13 | 13 | 13 |
| Acetal group [mol %] | 65 | 65 | 65 | 65 | 65 | 65 | 65 | 65 | 65 | 65 |
| Number of parts of plasticizer [phr] | 75 | 75 | 75 | 75 | 75 | 75 | 75 | 75 | 75 | 75 |
| Type of silica particle | None | Gel-derived silica | Gel-derived silica | Gel-derived silica | Gel-derived silica | Gel-derived silica | Gel-derived silica | Gel-derived silica | Gel-derived silica | Fumed silica |
| Silica particle diameter [μm] | — | 2.5 | 2 | 2.5 | 2.5 | 2.5 | 2.5 | 2.5 | 2.5 | 0.1 |
| Type of surface treatment agent for silica particle | — | None (powder addition) | None (powder addition) | Phenyl silane | Phenyl silane | Phenyl silane | Phenyl silane | Phenyl silane | Phenyl silane | Phenyl silane |
| Number of parts of silica [phr] | 0 | 20 | 20 | 20 | 20 | 20 | 20 | 20 | 20 | 20 |
| Thickness [μm] | 80 | 80 | 80 | 80 | 80 | 80 | 80 | 80 | 80 | 80 |
| Blending amount of surface treatment agent for silica particle 100 phr |  |  |  |  |  |  |  |  |  |  |
| KBM103 (Shin-Etsu Silicone: silane coupling agent) [phr] | — | — | — | 22.9 | 17.2 | 14.3 | 11.4 | 10.3 | 8.6 | 22.6 |
| Haze (evaluated with intermediate layer of 800 μm) | 0.35 | 1.48 | Opaque | 1.21 | 0.91 | 0.59 | 0.59 | 0.81 | 0.69 | 0.3 |
| Young's modulus (evaluated with intermediate layer of 800 μm) | 0.35 | 0.72 |  | 0.72 | 0.78 | 0.81 | 0.81 | 0.77 | 0.87 | 0.54 |
| Flexural rigidity (N/mm) of 1.8/1.0 mm laminated glass | 47.9 | 61.0 |  | 61.0 | 62.3 | 63.4 | 63.4 | 62.4 | 64.9 | 55.6 |
| Ratio of Young's modulus with respect to bench mark (BM) | BM | 2.06 |  | 2.06 | 2.23 | 2.31 | 2.31 | 2.2 | 2.49 | 1.54 |

As is apparent from Table 2, when silica particles are contained, the mechanical properties (flexural rigidity and Young's modulus) were found to be improved (from comparison between the result of Comparative Example 1 not containing silica and the results of Comparative Examples 2, 3, and Examples 1-7 containing silica).

Further, the optical property (haze value) was found to be improved (the haze value is decreased) by performing surface treatment to coat the surface with the organic coating material (from comparison between Comparative Example 2 in which the surface was not coated with the organic coating material and Examples 1-6 in which the surface was coated).

Here, from the results of Examples 1 to 6, the refractive index was found to be adjusted by changing the treatment amount of the silane coupling agent. Further, the haze value was also found to be adjusted. Since the refractive index of the particulate material is significantly changed by adjusting the treatment amount of the surface treatment, the refractive index of the particulate material is adjusted to a refractive index according to the refractive index of a transparent film to be employed for an intermediate layer, and designing of a desired haze value is found to be realized.

However, according to the result of Comparative Example 3, when a spherical silica having a large particle diameter of 2.0 μm is employed instead of an aggregated silica, even if surface treatment is performed by an amount similar to the amounts employed in Examples, opacity was caused by mixing the spherical silica into a transparent resin, and a sufficient optical property was not realized.

The invention claimed is:

1. A plasticizer composition, comprising:
   a composite aggregated particulate material; and
   a liquid plasticizer having the composite aggregated particulate material dispersed therein,
   wherein the composite aggregated particulate material includes
      an inorganic aggregate material which is a granular material including aggregates of an inorganic particulate material comprising silica having a specific surface area particle diameter of not less than 0.8 nm and not greater than 80 nm, and
      an organic coating material including an organic matter coating a surface of the inorganic aggregate material,
   the inorganic aggregate material has a volume average particle diameter of not less than 0.1 μm and not greater than 500 μm, and has a mode diameter of not less than 0.1 μm and not greater than 500 μm, and
   a mass of the organic coating material is not less than 0.8% and not greater than 80% with respect to a sum of a mass of the inorganic aggregate material and a mass of the organic coating material.

2. The plasticizer composition according to claim 1, wherein
   the inorganic aggregate material has the volume average particle diameter of not less than 0.1 μm and not greater than 100 μm, and has the mode diameter of not less than 0.1 μm and not greater than 100 μm.

3. The plasticizer composition according to claim 1, wherein
   the inorganic aggregate material comprises gel-derived silica, precipitated silica, or fumed silica.

4. The plasticizer composition according to claim 1, wherein
the liquid plasticizer comprises triethylene glycol di-2-ethylhexanoate.

5. The plasticizer composition according to claim 1, wherein
the organic matter is bound to the surface of the inorganic particulate material via SiO bonds.

6. The plasticizer composition according to claim 1, wherein
the organic matter comprises a silazane hydrolysate or a condensation product of a silane compound having at least one SiOR where R is a hydrocarbon.

7. A method for producing the plasticizer composition according to claim 1, the method comprising:
production step of producing the inorganic aggregate material from the inorganic particulate material; and
forming the organic coating material by reacting a silane compound with the inorganic aggregate material at the surface thereof to produce the composite aggregated particulate material.

8. A method for producing a transparent resin composition, the method comprising:
dispersing the composite aggregated particulate material in the liquid plasticizer to prepare the plasticizer composition of claim 1; and
forming a transparent resin material having the plasticizer composition dispersed therein.

9. A transparent film, comprising:
a transparent resin material; and
the plasticizer composition of claim 1 dispersed in the transparent resin material.

10. The transparent film according to claim 9, wherein the liquid plasticizer comprises triethylene glycol di-2-ethylhexanoate, and
the transparent resin material comprises polyvinyl acetal or triacetyl cellulose.

11. The transparent film according to claim 9, wherein the transparent resin material comprises polyvinyl butyral.

12. The transparent film according to claim 9, wherein the transparent resin material comprises triacetyl cellulose.

13. A laminated glass, comprising:
a first lamination glass member;
a second lamination glass member; and
an interlayer film formed between the first lamination glass member and the second lamination glass member and comprising the transparent film of claim 9.

14. The plasticizer composition according to claim 1, wherein a refractive index of the composite aggregated particulate material is higher than a refractive index of the inorganic particulate material.

15. The plasticizer composition according to claim 1, wherein the inorganic aggregate material has the volume average particle diameter of not less than 0.1 μm and not greater than 10 μm, and has the mode diameter of not less than 0.1 μm and not greater than 10 μm.

16. The plasticizer composition according to claim 1, wherein the inorganic aggregate material has the volume average particle diameter of not less than 0.5 μm and not greater than 10 μm, and has the mode diameter of not less than 0.5 μm and not greater than 10 μm.

17. The plasticizer composition according to claim 1, wherein the inorganic aggregate material has the volume average particle diameter of not less than 0.5 μm and not greater than 100 μm, and has the mode diameter of not less than 0.5 μm and not greater than 100 μm.

18. The plasticizer composition according to claim 1, wherein the inorganic aggregate material has the volume average particle diameter of not less than 0.5 μm and not greater than 500 μm, and has the mode diameter of not less than 0.5 μm and not greater than 500 μm.

* * * * *